UNITED STATES PATENT OFFICE.

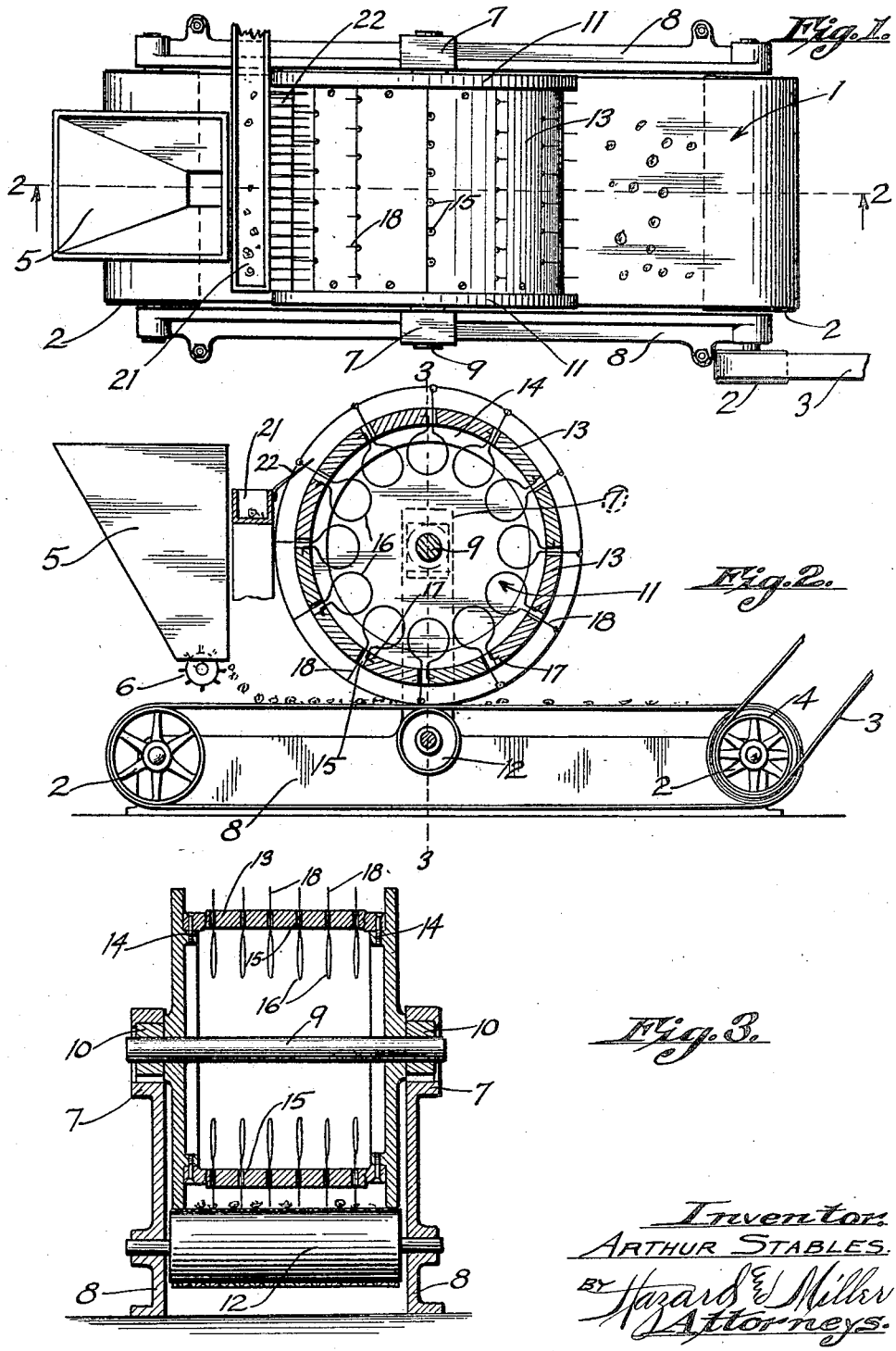

ARTHUR STABLES, OF LOS ANGELES, CALIFORNIA.

SEPARATOR FOR NUT MEATS FROM BROKEN NUTS.

1,416,585.  Specification of Letters Patent.  Patented May 16, 1922.

Application filed March 31, 1921. Serial No. 457,179.

*To all whom it may concern:*

Be it known that I, ARTHUR STABLES, a citizen of the United States, residing at Los Angeles, in the county of Los Angeles and State of California, have invented new and useful Improvements in Separators for Nut Meats from Broken Nuts, of which the following is a specification.

This invention is an apparatus whereby the kernels of nuts may be readily separated from the shells.

The mechanism includes essentially a conveyor for the broken nuts and a rotatable member co-operating therewith and having projecting engaging members which engage the kernels of the nuts so as to lift the same from the conveyor while permitting the shells to pass onto a suitable discharge. The engaging members carried by the rotatable means are arranged as yieldable prongs which will pierce the kernels of the nuts so as to remove the same from the conveyor while permitting the relatively hard shells of the nuts to pass on with the conveyor without being pierced by the prongs of the engaging means.

The invention will be readily understood from the following description of the accompanying drawings, in which—

Figure 1 is a plan view of the device constructed in accordance with the invention.

Fig. 2 is a longitudinal section on the line 2—2 of Fig. 1.

Fig. 3 is a transverse section on the line 3—3 of Fig. 2.

The endless conveyor of the apparatus is shown at 1 passing over suitable rollers 2, the shaft of one of which may be provided with any suitable drive means shown as a belt 3 passing over a pulley 4. A hopper 5 is arranged at one end of the endless conveyor and is provided with suitable discharge control mechanism 6 adapted to discharge the broken nuts uniformly to the endless conveyor.

Bearings 7 formed in the frame 8 of the apparatus carry a shaft 9 transversely of the endless conveyor and above the same beyond hopper 5. The bearings for shaft 9 are preferably adjustable bearings 10 permitting of movement of said shaft toward and away from the endless conveyor. A rotatable member is carried by the shaft and preferably includes end discs 11 adapted to rest upon endless conveyor 1. An idler 12 is preferably journaled in the frame of the apparatus beneath the endless conveyor where it is engaged by end discs 11.

The end discs are connected by a peripheral member spaced radially inwardly from the peripheries of said end discs, as clearly shown in Fig. 3. This peripheral member preferably includes arcuate sections 13 supported upon annular ribs 14 extending inwardly from the end discs 11, and the meeting edges of adjacent arcuate sections are spaced as shown at 15 so as to form openings through which the engaging members of the apparatus may project from the rotatable member.

Each of these engaging members comprises a spring loop 16 having the loop thereof arranged within the rotatable member. One end of the loop is engaged in a suitable recess 17 provided in one of the arcuate sections, while the other end 18 of the loop projects as a prong through the recess provided between adjacent arcuate sections. It will be understood that recesses 15 are arranged across the face of the peripheral member of the rotating device, as well as around the periphery thereof in order that a plurality of the prongs 18 will successively engage the nuts carried forward by the endless conveyor as the rotatable member is turned through the driving connection provided between the endless conveyor and the end discs 11.

The relatively hard shells of the broken nuts will not be engaged by prongs 18 which will yield as they pass over the same, and as a consequence the shells will be carried on with the endless conveyor and finally dumped therefrom. The prongs 18 will, however, pierce the kernels of the nuts and thereby elevate the same with the rotatable member. A suitable discharge means is provided for the nut kernels and is shown as comprising a discharge trough 21 arranged beyond the periphery of the rotatable member and having a plurality of fingers 22 projecting therefrom so as to overlie the periphery of the rotatable member and permit the prongs 18 to pass between the same. As a consequence the nut meats will be pulled from the prongs 18 by fingers 22, which latter are so inclined as to cause the meats to be discharged therefrom into trough 21. The trough may be arranged at a suitable inclination so that the nut kernels will drop through the same to suitable collecting means.

It will thus be seen that I have provided an extremely simple construction wherein nut meats may be readily separated from the shells in order that the shells may be suitably discharged while the nut meats are recovered.

Various changes may be made without departing from the spirit of the invention as claimed.

What is claimed is:

1. In a nut meat separator, the combination with an endless carrier, of a hollow cylindrical member arranged for rotation above said endless carrier, the wall of which cylindrical member is perforated, and a series of nut meat engaging members arranged within said hollow cylinder, each of which members comprises a spring loop, one end of which is secured to the wall of the cylinder and the opposite end portion extending through one of the perforations in the rotatable member, and the outer end of said outwardly extending end portion being pointed so as to engage nut meats on the endless carrier.

2. A separator including a rotatable member, engaging members carried by the same and each comprising a spring loop received within said rotatable member with one end engaging the latter and the other end projecting from said rotatable member.

3. A separator including a conveyor, a rotatable member beyond the same, engaging members carried by said rotatable member for co-operation with articles upon said conveyor and each comprising a spring loop received within said rotatable member with one end engaging the latter and the other end projecting from the same.

4. In a nut meat separator, the combination with an endless carrier, of a hollow cylindrical member arranged for rotation above said endless carrier, the wall of which cylindrical member is perforated, a series of nut meat engaging members arranged within said hollow cylinder, each of which members comprises a spring loop, one end of which is secured to the wall of the cylinder and the opposite end portion extending through one of the perforations in the rotatable member, the outer end of said outwardly extending end portion being pointed so as to engage nut meats on the endless carrier and means for stripping the nut meats from the outer ends of said engaging members.

5. A separator including a conveyor, a rotatable member above the same, engaging members carried by said rotatable member for co-operation with articles upon said conveyor, said engaging members each comprising a spring loop received within said rotatable member with one end engaging the latter and the other end projecting from said rotatable member and forming a prong.

In testimony whereof I have signed my name to this specification.

ARTHUR STABLES.